United States Patent
Katz

[11] 3,921,479
[45] Nov. 25, 1975

[54] FEED MECHANISM FOR AN END-BEVEL MACHINE

[75] Inventor: Lyber Katz, Bronx, N.Y.

[73] Assignee: Tubeco, Inc., Brooklyn, N.Y.

[22] Filed: Feb. 22, 1974

[21] Appl. No.: 444,775

[52] U.S. Cl. ............... 82/21 A; 82/14 A; 82/14 B; 82/21 B; 90/21.5; 91/35; 91/48; 91/413
[51] Int. Cl.² ...................... B23B 5/36; B23B 5/38
[58] Field of Search ...... 82/21 A, 21 B, 14 A, 14 B, 82/14 C; 91/35, 36, 48, 413; 90/21.5

[56] References Cited
UNITED STATES PATENTS

| | | | |
|---|---|---|---|
| 2,713,246 | 7/1955 | Dall et al. | 91/36 |
| 2,972,868 | 2/1961 | Sassen | 91/36 |

*Primary Examiner*—Leonidas Vlachos
*Attorney, Agent, or Firm*—Hopgood, Calimafde, Kalil, Blaustein & Lieberman

[57] ABSTRACT

The invention contemplates two-component feed mechanism for a machine tool, whereby a single adjustment is operative to determine the relative rate of feed for the respective feed components. For machines in which the two component motions are effectively rectilinear, the single adjustment thus determines the slope of the resultant of the two feeds. In the form herein specifically disclosed, feed advances are by stepped increments, in alternating succession for the respective feed components, and the single adjustment determines the selected fractional division of a given time cycle to be shared for successive increments of the respective component-feed displacements.

9 Claims, 3 Drawing Figures

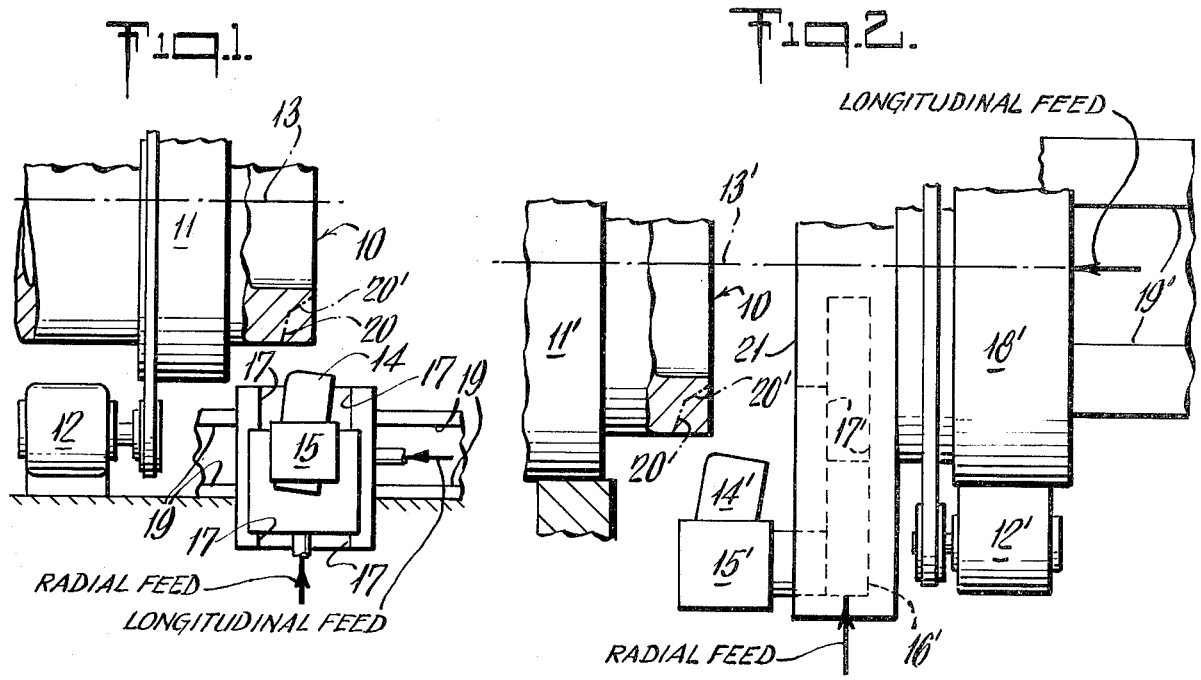
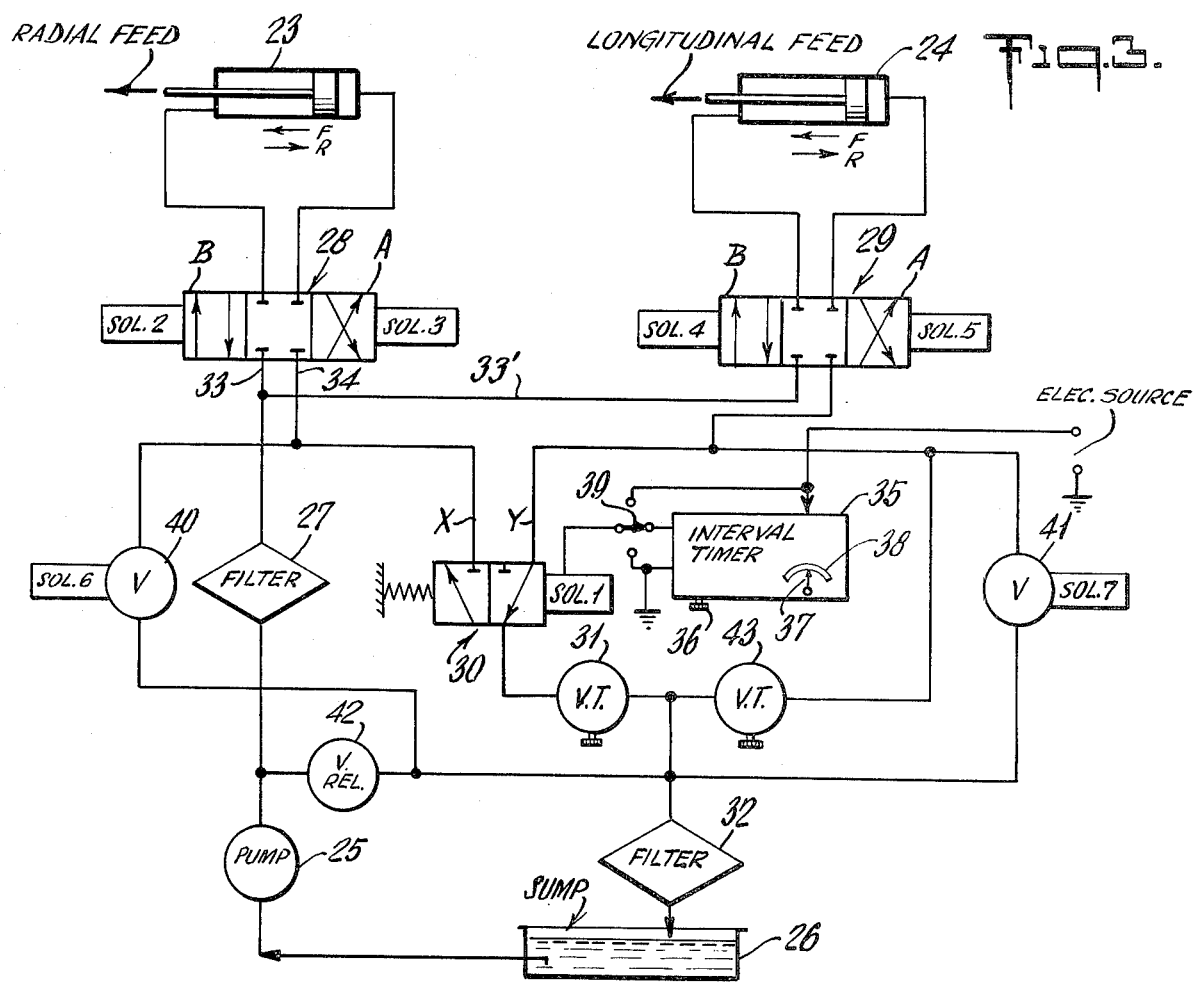

FEED MECHANISM FOR AN END-BEVEL MACHINE

The invention relates to feed mechanism for a machine tool, and in particular to a simplified control for a two-component feed mechanism.

It is an object of the invention to provide improved means of the character indicated.

Another object is to provide an improved simplified control means for the respective feed components of a two-component feed mechanism.

A specific object is to meet the above objects with a control means requiring but a single adjustment in order to selectively determine the feed rate of one component in relation to that of the other component of such a feed mechanism.

Another specific object is to provide an improved bevel-generating feed control for a mechine lathe.

A further specific object is to provide for selective change of bevel-slope generation, in the course of a bevel-generating traverse of a tool and a workpiece, in such a machine.

A still further specific object, in such a machine, is to provide for selective adjustment of feed rate, without changing the selected proportionality of feed rates of the respective component feeds.

A general object is to meet the above objects with basically simple mechanism that is applicable with relative ease to existing machines and machine types.

Other objects and various further features of novelty and invention will be pointed out or will occur to those skilled in the art from a reading of the following specification, in conjunction with the accompanying drawings.

In said drawings, which show, for illustrative purposes only, a preferred form of the invention, in application to two different kinds of machine tool:

FIGS. 1 and 2 are simplified fragmentary views in elevation to respectively illustrate two types of machine tool to which the invention is applicable; and FIG. 3 is a diagram schematically indicating control and feed mechanism of the invention, applicable for example to either of the machines of FIGS. 1 and 2.

The machines of FIGS. 1 and 2 are both lathes, and each has feed mechanism which is independently operable to generate two orthogonally related components of feed displacement, for a workpiece and for a tool, with respect to each other.

The machine of FIG. 1 is of the work-rotating variety, shown with one end of a tubular workpiece 10 held in rotatable chucking means 11; a frame-mounted motor 12 continuously drives workpiece 10 about its axis 13. A tool 14 is mounted by its holder 15 to a cross-slide 16; cross-slide 16 is movably positioned in guide means 17 forming part of a main slide 18 and, in turn, main slide 18 is movably postioned in guide means 19 forming part of the machine frame. The guide means 17–19 are shown to be orthogonally related, the latter 19 being parallel to the axis 13 of work rotation, and appropriate legends identify heavy arrows which will be understood to suggest the respective longitudinal and radial feed mechanisms of a two-component system for feeding tool 14 with respect to the workpiece 10. A desired two-slope profile of end-bevel cut is indicated by dashed line 20–20'. Such a cut may be, for example, appropriate to preparing an end of one pipe for butt-welded assembly to the similarly finished end of another pipe.

The machine of FIG. 2 is of the tool-rotating variety, shown with one end of the tubular workpiece 10 held in fixed chucking means 11', i.e., fixed with respect to the machine frame. A tool 14' is mounted by its holder 15' to slide means 16' movably guided at 17' in a rotatable arm or plate 21; plate 21 is mounted in main-slide structure 18', for rotation about an axis 13' which is aligned with the axis of the workpiece 10, and a slide-mounted motor 12' continuously drives tool 14' about the workpiece axis 13'. The main slide 18' is movably positioned in guide means 19' forming part of the machine frame. The guide means 17'–19' are shown to be orthogonally related, the latter 19' being parallel to the rotary axis 13', and appropriate legends again identify heavy arrows which will be understood to suggest the respective longitudinal and radial feed mechanisms of a two-component system for feeding tool 14' with respect to the workpiece 10, for which a desired two-slope cut profile 20–20' is indicated.

The two-component feed systems of either of FIGS. 1 and 2 may be fluid-pressure operated, as by the single hydraulic system shown in FIG. 3, wherein separate doubleacting actuating cylinders 23–24 serve the respective radial and longitudinal components of feed. In each cylinder, an actuator rod tracks piston displacement and will be understood to effect actuating displacement of the tool 14 (14') in accordance with the labeled heavy arrows of FIG. 1 or of FIG. 2; further sets of arrows, labeled "F" and "R" in FIG. 3 will be understood to suggest a preference for piston displacement away from the head end of each cylinder for the feed or working stroke direction "F", and for piston displacement to be toward the head end of each cylinder for the returnstroke direction "R".

As shown, pump means 25 draws hydraulic fluid from a reservoir or sump 26. Pressurized fluid is filtered at 27 before parallel-circuit division, to serve the respective cylinders 23–24, all in accordance with the current setting of a so-called four-way three-position valve 28–29 governing the direction of fluid flow in the respective parallel feed circuits. Return fluid from these respective circuits is passed to separate inlet ports X–Y of a three-way two-position valve 30, and thence for discharge via a throttle valve 31 and filter means 32 to the sump 26. A first solenoid (SOL.1) determines the actuated position of valve 30, the same being shown for its spring-biased position wherein flow admitted at port Y is connected for discharge to the sump 26; excitation of SOL.1 will be understood to overcome the spring bias so that flow admitted at port X becomes connected for discharge to the sump 26.

Valve 28 is shown for its unactuated condition, wherein fluid flow in supply line 33 and fluid discharge via outlet line 34 are both blocked, thus foreclosing radial-feed displacement. Excitation of the first (SOL.2) of two solenoids will be understood to effect a right-to-left actuation of the valve member of valve 28, placing the "cross-over " portion A thereof in such registration with lines 33–34 as (i) to apply pressurized fluid to the head end of cylinder 23, for a "forward" radial-feed displacement, and (ii) to accommodate the exhaust discharge of fluid displaced via the tail end of cylinder 23. In analogous fashion, excitation of the other (SOL.3) of the two solenoids associated with the valve member of valve 28 will be understood to place the "straight" portion B thereof in such registration with lines 33–34 as (i) to apply pressurized fluid to the tail end of cylinder 23, for a "retracting" radial-feed displacement, and (ii) to accommodate the exhaust discharge of fluid displaced via the head end of cylinder 23. Of course, whatever the SOL.2 or SOL.3 actuated condition of valve 28, no fluid will flow (and, therefore, no radial-feed displacement can take place) unless SOL.1 has also been excited so as to connect the discharge flow, via X, to the sump 26.

Valve 29 is in all respects as described for valve 28, except that its actuating solenoids are identified SOL.4 and SOL.5, respectively, and longitudinal feed flows are discharged via the Y inlet to valve 30.

In the form shown, cycle-dividing control means such as an interval timer 35 provides a succession of electrical excitation pulses to SOL.1, pursuant to a repetitive cycle of period selected by adjustable means 36, and pursuant to an on-off fractional division of the cycle; the fractional division is selected by adjustable means 37 against a graduated scale 38. It will be understood that for the mid-position shown for means 37, the excitation cycle to SOL.1 will be 50 percent ON and 50 percent OFF, thus assuring equal division of discharge flows from the radial and longitudinal feed means 23–24, such flows being responsible for feed directions F or R as determined by the particular solenoid-actuated condition of valves 28–29. For the cycle division set at 37 for 25 percent ON and 75 percent OFF, the net flow discharged through the longitudinal feed system will be three times that which is discharged through the radial-feed system; similarly, for the cycle division set at 37 for 75 percent ON and 25 percent OFF, the net flow discharged through the longitudinal-feed system will be one-third that which is discharged through the radial-feed system. Adjustment at 37 thus determines the proportional relationship between radial and longitudinal feed displacements and, hence, the resultant slope of the bevel produced by the tool on the work, as long as the cycle period selected at 36 is such in relation to the roughness of tool cut as not noticably to degrade the desired finish of the cut. For example, the cycle period selected at 36 should generally be at least no greater than the order of magnitude of the cycle of machine rotation about the work axis 13 (13').

To complete the description of connections involving timer 35, a selector switch 39 is shown in the control-line connection to SOL.1. In the center one of its three positions, switch 39 applies timer output to this solenoid in accordance with the above description. In the upper one of its three positions, switch 39 applies steady excitation voltage to SOL.1, thus assuring a pure radial feed, as in a cut-off operation. In the lower one of its three positions, switch 39 connects SOL.1 to ground, thus assuring a pure longitudinal feed, as when dressing the outer surface of the workpiece to a purely cylindrical finish.

The circuit of FIG. 3 will be seen to provide certain further features to enhance the universality of application of the invention. Among these, an on-off valve 40, operated by solenoid SOL.6, determines whether or not discharge fluid from the radial-feed circuit will be shunted past valves 30–31. Such shunted flow will not be subject to the interruptions dictated by timer 35, nor will it be subject to the restriction attributable to the throttle setting at 31. The shunted flow thus enables and determines a jump or rapid-traverse feed in the radial-feed system, the direction of jump feed being as selected by excitation of one or the other of SOL.2 and SOL.3. In similar fashion, another on-off valve 41, operated by SOL.7 determines whether or not discharge fluid from the longitudinal-feed circuit will be shunted past valves 30–31; SOL.7 operation thus determines a longitudinal-jump feed, in the direction determined by which one of SOL.4 and SOL.5 is excited.

For safety and for uniformity of pressure-fluid delivery to the described feed mechanisms, a relief valve 42 spills excess fluid to sump 26, for pump-output pressures exceeding a predetermined threshold. Still further, a throttle valve 43, in shunt from one of the feed-component discharge lines and across valves 30–31, provides fine adjustment of the desired flow rate at Y in relation to that at X, thus enabling the two feed systems to be "balanced"; stated in other words, adjustment at 43 will be seen to determine the lineal-displacement response (per unit volume of fluid flow) at 24, in relation to the corresponding response at 23. Having thus provided for balancing these two component lineal-displacement responses, the scale 38 may be, and preferably is, inscribed and calibrated in terms of slope angle, for the resultant feed accomplished by adjusted positioning of selector means 37.

The described mechanism may be incorporated into automating structure whereby a given fully automated end-bevel or the like cut may be repeatedly generated, for successively chucked workpieces. However, for the end-bevel finishing of tubular workpieces which are of relatively large pipe, such automation is not presently desirable and therefore it will suffice to describe the means for actuating the various solenoids as being manually actuable. Thus, as already indicated, the setting of selector switch 39 determines whether a purely radial feed, or a purely longitudinal feed is to proceed, or whether timer 35 is to be used to generate a resultant feed, of slope selected at 37 against scale 38. For selection of radial-feed direction, a first single selector switch (e.g., of the single-pole, double-throw variety) will serve for selective excitation of one to the exclusion of the other of SOL.2 and SOL.3; a second such switch similarly serves SOL.4 and SOL.5, for selection of direction of longitudinal feed. And the rapid-traverse solenoids, SOL.6 and SOL.7 may each be served by its own push-button switch, having momentary single-pole, single-throw capability.

For appreciation of relative magnitudes, an illustrative application will be described, for the case of an end-bevel cut on tubular carbon-steel pipe of 20-inch diameter and 1-inch thickness, for which tool rotation about the workpiece axis is about 50 rpm. In this circumstance, a four-second cycle period may be selected at 36, for the on-off cycle period of timer 35. Let it be assumed that the radial-feed (cross-feed) cylinder 23 has an effective sectional area of 12 in$^2$, that the longitudinal-feed cylinder 24 has an effective sectional area of 18 in$^2$, and that pump 25 delivers fluid at a constant 100 in$^3$/min, the throttle valve 31 being set to determine a substantially reduced feed-flow rate of 10 in$^3$/min. The conditions establish a radial-feed rate (for any given pulsed opening to accommodate discharge via port X) of 10 (in$^3$/min)/12 (in$^2$), or 0.833 in/min; similarly, a longitudinal feed rate is determined to be 10 (in$^3$/min)/18 (in$^2$), or 0.555 in/min.

If the interval division (cycle fraction) is selected at 37 so as to provide 50:50 division of on vs. off excitation for SOL.1, then the resultant slope angle $\theta$ for the two components of feed, with respect to the work axis 13 (13'), is given as:

$$\theta_1 = \arctan\left(\frac{0.833 \times 0.50}{0.555 \times 0.50}\right) = 56.3°.$$

If the interval division is otherwise set, for example to provide a 30:70 division of the on vs. off excitation of SOL.1, then the resultant slope is given as:

$$\theta_2 = \arctan\left(\frac{0.833 \times 0.30}{0.555 \times 0.70}\right) = 32.8°$$

Expressed in other terms, the actual resultant feed rate, for example for the $\theta_2$ condition, is given as:
$[(0.833 \times 0.30)^2 + (0.555 \times 0.70)^2]^{1/2}$ = approximately 0.46 in/min
And for the assumed case of 50 rpm rotation about the work axis, resultant feed can be expressed as:

$$\frac{0.46 \text{ in/min}}{50 \text{ rev/min}}, \text{ or } 0.0092 \text{ in/rev}$$

It will be seen that the described invention meets all stated objects. Available components are used throughout, and high accuracy is achieved for selected slope generation, even for selective change of slope (adjustment at 37) in the course of making a cut, as to the profile 20–20'. Once slopes are ascertained, the scale 38 may be calibrated to read directly, and fine adjustment at 43 provides a ready means of trimming the proportion of flow rates to assure adherence to the calibration of scale 38.

While the invention has been described in detail for the preferred form shown, it will be understood that modifications may be made without departure from the claimed invention. For example, the hydraulic circuits schematically shown in FIG. 3 are intentionally simplified, and it will be understood that such measures as to employ a check valve in each of the branch lines 33–33' which supply pressure fluid to the respective inlets of valves 28–29 may insure mutual isolation of the desired flows in these branches.

What is claimed is:

1. In a machine of the character indicated, work-holding means, tool-holding means, and two-component feed means for two-component relative movement of said holding means, each feed component of said feed means comprising its own independent motion-displacement mechanism, cycle-dividing control means having means for the selected division of the cycle thereof into a first timed fraction having a selected relation to the remaining timed fraction of the cycle, and independent control connections from said control means to each of the respective component motion-displacement mechanisms such that the timed control of said mechanisms is in accordance with the selected fractional sharing of the cycle of said control means, whereby the resultant displacement is a function of the selection of cycle division.

2. The machine of claim 1, wherein each feed-component motion-displacement mechanism comprises pressure-responsive actuating means and wherein a single source of pressure fluid is connected via said control means to said respective actuating means.

3. The machine of claim 2, wherein each of said actuating means is double-acting.

4. The machine of claim 3, wherein each of the connections from said control means to said respective actuating means includes selectively operable flow-reversing means.

5. The machine of claim 2, in which a single selectively variable throttling means is in the circuit of said source, serving in common the controlled flows to said respective actuating means.

6. The machine of claim 5, in which a by-pass line is connected from one of said actuating means in shunt across said control means and said throttling means, said by-pass line having lesser flow-restriction properties than said throttling means, and selectively operable valve means for determining the open/closed condition of said by-pass line, whereby a rapid traverse of one of said motion components is selectively available.

7. The machine of claim 6, in which a second such by-pass line with selectively operable valve means is connected from the other of said actuating means in shunt across said control means and said throttling means, whereby a rapid traverse of the other of said motion components is selectively available.

8. The machine of claim 5, in which a further single selectively variable throttling means is connected from one of said actuating means in shunt across said control means and said first mentioned throttling means, whereby fine adjustment is available for the relative flows to the respective actuating means during such flow intervals as are determined by said control means.

9. The machine of claim 1, in which said control means includes means for the selective connection of said control means to one to the exclusion of the other of said component displacement mechanisms without regard for the instantaneously selected cycle-fraction timing of said control means.

* * * * *